US008509824B2

(12) United States Patent
Bennett (10) Patent No.: US 8,509,824 B2
(45) Date of Patent: Aug. 13, 2013

(54) PHONE BASED TEXT MESSAGE LANGUAGE TRANSLATION

(75) Inventor: James D. Bennett, Hroznetin (CZ)

(73) Assignee: Broadcom Corporation, Irvine, CA (US)

(*) Notice: Subject to any disclaimer, the term of this patent is extended or adjusted under 35 U.S.C. 154(b) by 933 days.

(21) Appl. No.: 12/183,278

(22) Filed: Jul. 31, 2008

(65) Prior Publication Data

US 2009/0305729 A1  Dec. 10, 2009

Related U.S. Application Data

(60) Provisional application No. 61/058,747, filed on Jun. 4, 2008.

(51) Int. Cl.
*H04W 4/00* (2009.01)
*H04M 11/00* (2006.01)
*H04L 12/58* (2006.01)

(52) U.S. Cl.
USPC ...... 455/466; 455/406; 455/412.1; 455/414.1

(58) Field of Classification Search
USPC .................. 455/406, 407, 408, 412.1, 412.2, 455/414.1, 414.4, 432.1, 432.2, 432.3
See application file for complete search history.

(56) References Cited

U.S. PATENT DOCUMENTS

| 5,884,246 | A |   | 3/1999 | Boucher |
| 5,943,616 | A | * | 8/1999 | Andersson ................ 455/422.1 |
| 6,161,082 | A |   | 12/2000 | Goldberg |
| 2002/0188670 | A1 |   | 12/2002 | Stringham |
| 2005/0225030 | A1 | * | 10/2005 | Baldry ........................ 273/248 |
| 2009/0082042 | A1 | * | 3/2009 | Harendra et al. ............. 455/466 |

FOREIGN PATENT DOCUMENTS

| EP | 1253772 A | 10/2002 |
| WO | WO02071259 A | 9/2002 |
| WO | WO2007098012 A | 8/2007 |

* cited by examiner

*Primary Examiner* — Wesley Kim
(74) *Attorney, Agent, or Firm* — Garlick & Markison; Edward J Marshall (57) ABSTRACT

Processing text messages by a message processing server to translate the text message from a native language to a preferred language. Operation begins with receiving text message delivery language preferences regarding a wireless device, the text message delivery language preferences identifying at least one preferred language for delivery of text messages to the wireless device. Operation continues with receiving a text message intended for the wireless device, the text message in a native language. Further, based upon the text message delivery language preferences regarding the wireless device, operation determines a preferred language for delivery of the text message, the preferred language different than the native language. Then, the text message is translated from the native language to the preferred language and transmitted in the preferred language for delivery to the wireless device.

18 Claims, 7 Drawing Sheets

PHONE BASED TEXT MESSAGE LANGUAGE TRANSLATION

CROSS REFERENCES TO PRIORITY APPLICATIONS

This application claims priority under 35 U.S.C. 119(e) to U.S. Provisional Application Ser. No. 61/058,747, filed Jun. 4, 2008, and having a common title with the present application, which is incorporated herein by reference in its entirety for all purposes.

BACKGROUND

1. Technical Field of the Invention

This invention relates generally to wireless communications, and more particularly to wireless communication messaging.

2. Related Art

Short Message Service (SMS), SkyMail, Short Mail, Instant Messaging (IM), chat, Mobile Instant Messaging (MiM), Multimedia Messaging Service (MMS), and other messaging services (together, text messaging) are well known. Text messaging is supported by computer devices such as laptop computers, desktop computers, handheld computers, and wireless devices such as cellular telephones, Wireless Local Area Network (WLAN) terminals, Wireless Wide Area Network (WWAN) terminals, and Wireless Personal Area Network (WPAN) terminals, for example. Typically, a text message server serves as an intermediate device for receiving a text message from a source device, storing the text message, and forwarding the text message to a recipient device, e.g., a first cell phone as a source device and a second cell phone as a recipient device. While some text message service providers charge for text message support, e.g., cellular networks, other text message service providers support text messaging without charge. Various protocols such as SS7, GSM MAP, or TCP/IP, for example, may be employed to support text messaging.

With IM, two or more IM enabled devices, having knowledge of each other's network locations or network identities, support the transmission and receipt of text messages. An IM session may include the transfer of numerous messages back and forth between the devices. Further, with IM, an IM group may be setup in which messages are interchanged between more than two devices, i.e., each text message originates from a source device and is transmitted to multiple recipient devices.

SMS is often used by wireless service providers to send information to serviced wireless devices. For example, a service provider may send a short message to one or more serviced wireless devices relating information regarding a user's account, regarding services that the wireless service provider employs, advertisements, or other information. These text messages are in a language selected by the wireless service provider. However, users of wireless devices do not always speak or read the language of the text message. In such case, the user of the wireless device simply disregards the message or seeks an individual to learn of the content of the message that the user cannot read. Thus, the user must either disregard what may be important information contained in the text message or go to extra efforts to learn of content of the text message, which may be unimportant. Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

DETAILED DESCRIPTION OF THE DRAWINGS

Figure 1:
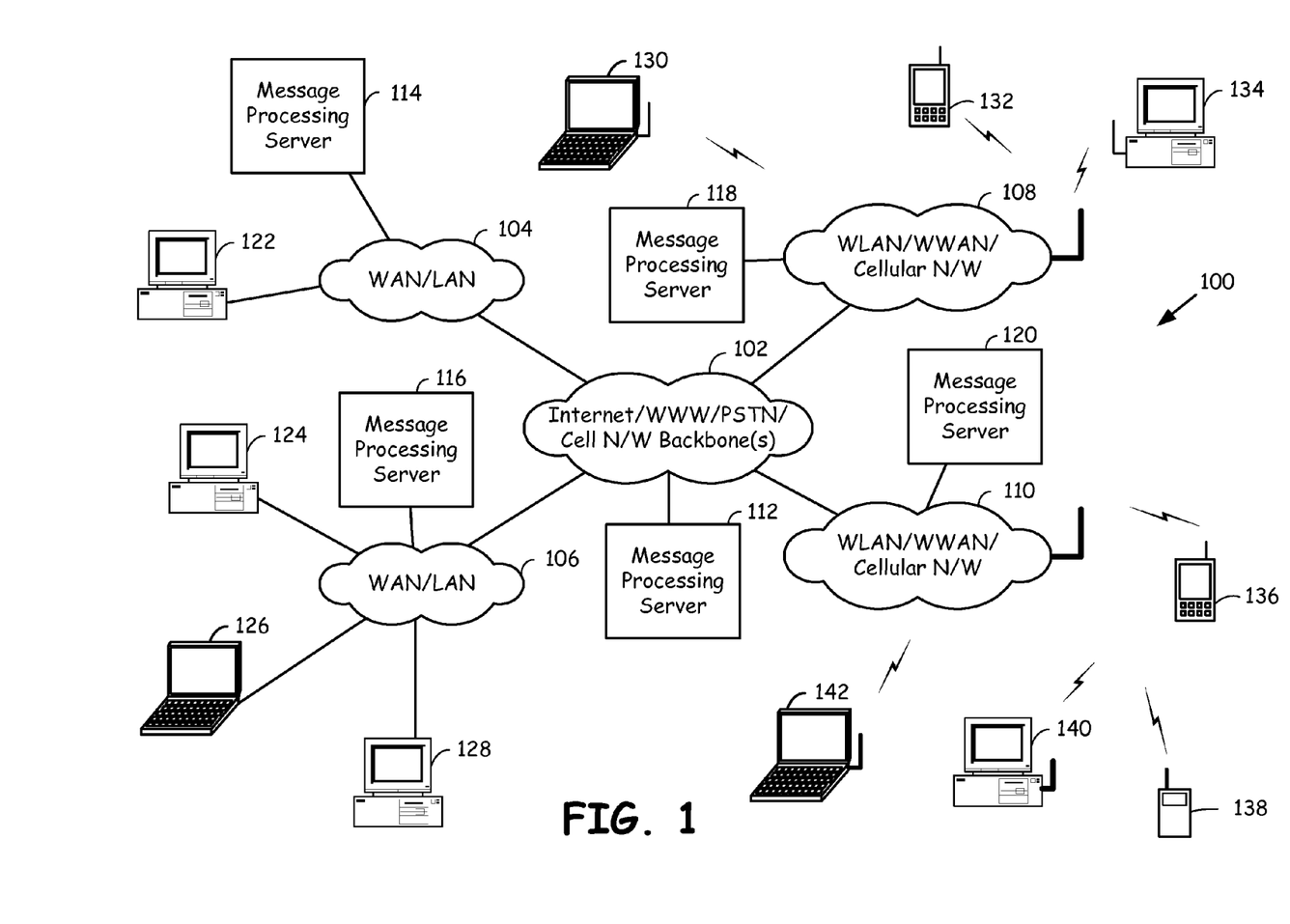
FIG. 1 is a system diagram illustrating networks, wireless devices, and message processing servers that operate according to one or more embodiments of the present invention.

FIG. 1 is a system diagram illustrating networks, wireless devices, and message processing servers that operate according to one or more embodiments of the present invention. The system 100 of FIG. 1 includes a central network 102 that may be one or more of the Internet, the World Wide Web, one or more Public Switched Telephone Network (PSTN) backbone networks, and/or one or more cellular backbone networks. Wireless networks 108 and 110 each include one or more of a Wireless Local Area Network (WLAN), a Wireless Wide Area Network (WWAN), a Wireless Personal Area Network (WPAN), and a cellular network 108. Each of these wireless networks 108 and 110 includes one or more network infrastructures and a plurality of wireless access devices that support wireless communications with a plurality of serviced wireless devices. Each of wired networks 104 and 106 includes one or more of a Wide Area Network (WAN) and a Local Area Network (LAN). The wired networks 104 and 106 may include a plurality of differing wired network types and may also include some wireless links that operate to support the wireless network infrastructures 104 and 106. Networks 102, 104, 106, 108, and 110 couple to one another to support communications there between. Communications among these networks 102-110 may be supported by Internet Protocol (IP) type communications, for example. These networks 102-110 support packetized data communications, packetized voice communications, packetized video communications, packetized email communications, packetized web page interchanges, and many other types of electronic communications.

WAN/LAN 104 supports communications with wired device 122. WAN/LAN 106 supports wired communications with wired device 124, 126, and 128. Each of devices 122, 124, 126, and 128 may be a personal computer, a laptop computer, or another computing device that supports electronic communications including messaging such as short messaging, instant messaging, and other types of messaging via serviced networks 104 and 106.

Wireless network 108 supports wireless communications with wireless devices 130, 132, and 134. As is shown, wireless device 130 is a laptop computer, wireless device 132 is a handheld computer/wireless terminal, and wireless device 134 is a desktop computer. Likewise, wireless network 110 supports wireless communications with wireless devices 136, 138, 140, and 142. As is shown, wireless device 136 is a handheld computer/wireless terminal, wireless device 138 is a cellular telephone/WLAN telephone/WWAN telephone/WPAN telephone or another wireless telephone, wireless device 140 is a desktop computer, and wireless device 142 is a laptop computer. Each of the wireless devices 130-142 supports one or more types of messaging including short message service messaging, instant messaging, and other messaging. Thus, according to the system 100 of FIG. 1, each of the wired devices 122-128 and wireless devices 130-138 may message one another to service requirements of a user.

The system 100 of FIG. 1 also includes a plurality of message processing servers 112, 114, 116, 118, and 120. Each of these messaging processing servers is capable of translating text messages, e.g., Short Message Service (SMS) messages, SkyMail messages, Short Mail messages, Instant Messaging (IM) messages, chat messages, Mobile Instant Messaging (MiM) messages, Multimedia Messaging Service (MMS) messages, and other text messages from a native language to a preferred language. The structure of the message processing servers 112-120 will be described further herein with reference to FIG. 5. The operations of the message processing servers 112-120 will be described further herein with reference to FIGS. 2-3 and FIGS. 6-7. An example structure of a wireless device, such as any of wireless devices 122-142 will be described further herein with reference to FIG. 4. Further, the operations of the wireless devices will be described further herein with reference to FIGS. 2-3 and FIGS. 6-7.

Figure 2:
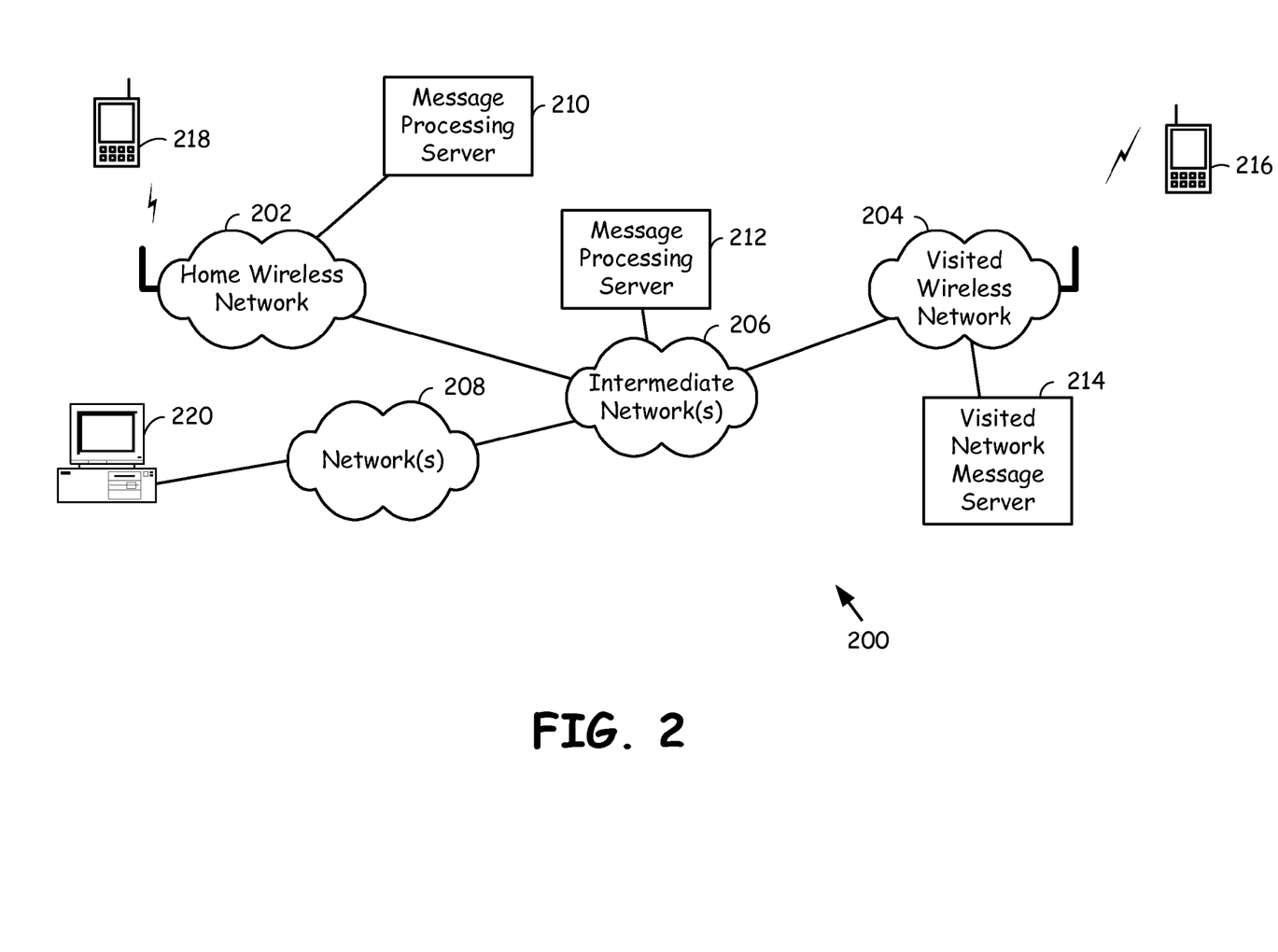
FIG. 2 is a system diagram that supports message processing operations according to one or more embodiments of the present invention.

FIG. 2 is a system diagram that supports message processing operations according to one or more embodiments of the present invention. The system 200 of FIG. 2 includes a home wireless network 202, a visited wireless network 204, one or more intermediate networks 206, and one or more other networks 208. The home wireless network 202 is a home network for wireless device 218 and for wireless device 216. The visited wireless network 204 services wireless device 216 while it is roaming. The visited wireless network 204 may be on the same continent, in the same country, in the same state, in the same city, or even overlaying with the home wireless network 202. Alternatively, the visited wireless network 204 may be separated by a great geographic distance from home wireless network 202. Interaction of the visited wireless network 204 and home wireless network 202 in servicing roaming terminal 216 is well known. Thus, the operations for servicing a roaming wireless device 216 will not be described further herein other than as relating to the present invention.

The system 200 also includes computing device 220 and visited network message server 214. Either (or both) of computing device 220 or visited network message server 214 sends a text message intended for delivery to wireless device 216. Because the wireless device 216 is associated with home wireless network 202, the text message emanating from either visited network message server 214 or computing device 220 must first traverse one or more network paths to a message processing server 210 within home wireless network 202 (or otherwise servicing home wireless network 202). According to another aspect of the present invention, incoming messages intended for wireless device 216 are received and processed by a text message server (not shown) of home wireless network 202 other than the message processing server 210. In any case, the text message is eventually forwarded to the message processing server 210.

After the message processing server 210 receives the text message intended for delivery to wireless device 216, the message processing server 210 performs processing to determine a location of the wireless device 216 for subsequent delivery of the text message. Because of local number portability support, text messages may pass through home wireless network 202 even though the text message is intended for a wireless device whose home wireless network is no longer home wireless network 202. Further, for roaming wireless terminals, such as wireless device 216, the message processing server 210 interfaces with a home location register, visitor location register, or another device with home wireless network 202 (none of which are shown in FIG. 2) to determine a current location or last known location of wireless device 216. Based upon this information, the message processing server 210 transmits the message received from message server 214 or computer device 220 via network 202, intermediate networks 206, and visitor wireless network 204 for delivery to wireless device 216.

According to embodiments of the present invention, the text message sent by visited network message server 214 or computing device 220 intended for wireless device 216 may not be in a language that is not preferred by a user of the wireless device 216 but instead is in a native language of the device creating the text message. Thus, according to the present invention, message processing server 210 or message processing server 212 coupled to intermediate networks 206 may translate the text message prior to delivery to wireless device 216. According to operations of the present invention embodied by message processing servers 210 or 212, message processing server 210 or message processing server 212 receives text message delivery language preferences regarding the wireless device 216. The text message delivery language preferences identify at least one preferred language for delivery of text messages to the wireless device 216. Then, upon receipt of the text message from visited network message server 214 or computing device 220, the message processing server 210 or 212 translates the text message from a native language to a preferred language based upon the text message delivery language preferences previously received regarding wireless device 216. After translation of the text message, the message processing server 210 or message processing server 212 then transmits the text message in the preferred language for delivery to the wireless device.

With the system 200 of FIG. 2, the text message delivery language preferences may be received by message processing server 210 or 212 directly from wireless device 216. Alternatively, the text message delivery language preferences may be stored in the home wireless network 202, at a home location register, for example and then provided to the message processing server 210 or 212. In either of these operations, the text message delivery language preferences may be received along with the text message. Alternatively, upon receipt of a text message intended for the wireless device 216, message processing server 210 or 212 may query the wireless device 216 for the text message delivery language preferences. Based upon subsequent receipt of the text message delivery language preferences, the message processing servers 210 and 212 then translate the text message from the native language to the preferred language.

Optionally, a servicing message processing server 210 and 212 that translates the text message from the native language to the preferred language prepares/creates a billing record regarding the translation operation. Then, the message processing server 210 or 212 transmits the billing record to a network that may be responsible for payment. In one operation, the billing record is sent to the home wireless network 202 that bills the user of wireless device 216 for the translation operations. According to another operation or embodiments the message processing server 210 or 212 transmits the billing record to a home network of a source device, i.e., the visited wireless network 202, for billing to the source device, i.e., visited network message server 214. In either case the organization or company that performed the text message translation prior to delivery of the translated text message to wireless device 216 will be compensated for such translation.

According to another operation of the present invention as embodied in FIG. 2, a text message is generated by the visited network message server 214 or computing device 222 for delivery to wireless device 216. However, based upon information stored at the home wireless network 202 and/or at the message processing server 210, a location of the wireless device 216 is not known. In such case, the text message, either before or after translation from the native language to the preferred language, is stored at a component of the home wireless network 202, e.g., a text message server or at the message processing server 210.

Figure 3:
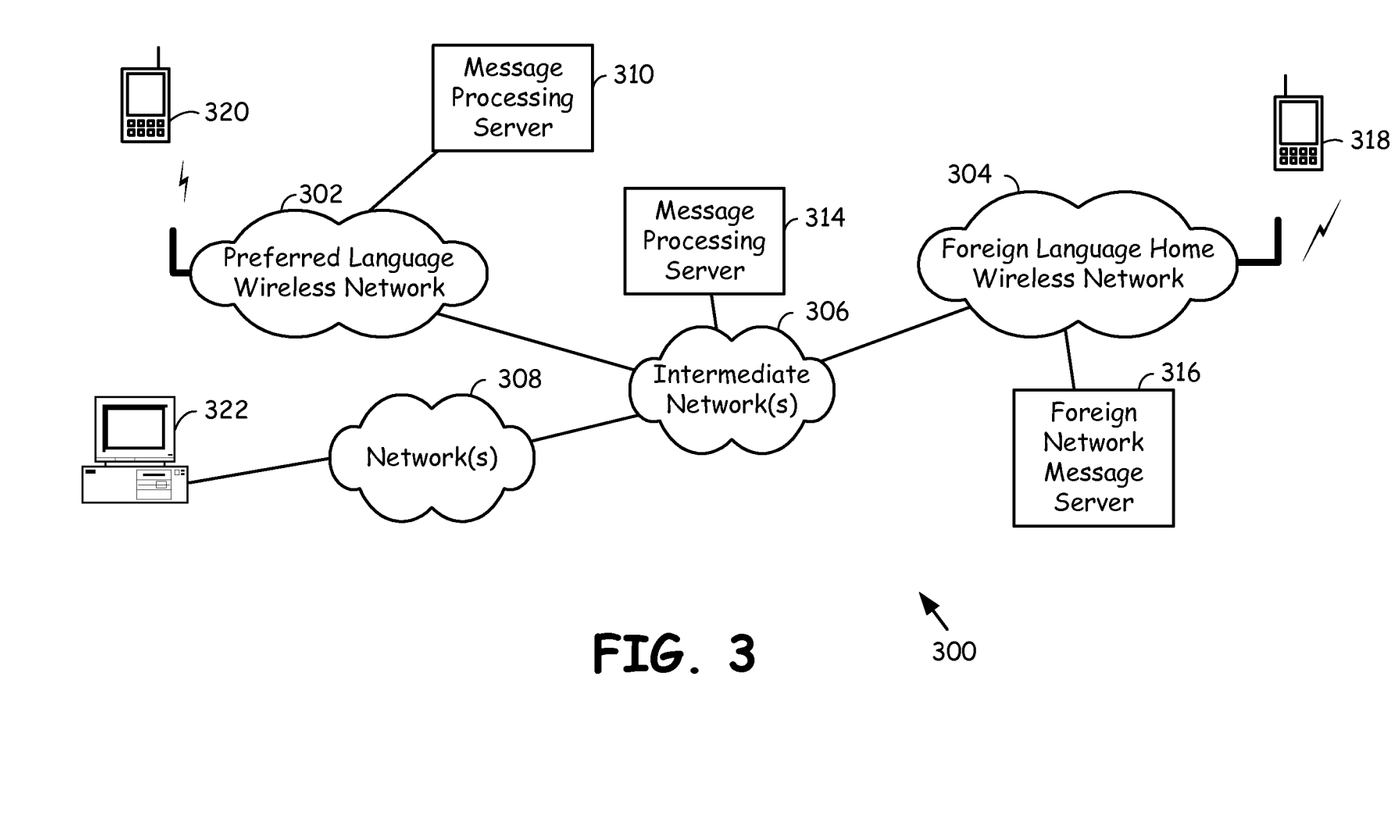
FIG. 3 is a system diagram that supports message processing operations according to one or more embodiments of the present invention.

FIG. 3 is a system diagram that supports message processing operations according to one or more embodiments of the present invention. The system 300 of FIG. 3 includes a plurality of networks, a plurality of servers, and a plurality of devices servicing communications for respected users. In particular, the system 300 of FIG. 3 includes a preferred language wireless network 302, a foreign language home wireless network 304, intermediate networks 306, and other networks 308. These networks 302, 304, 306, and 308 couple to each other to service electronic communications passed there between.

Wireless device 320 is served by preferred language wireless network 302. Wireless device 318 is serviced by foreign language home wireless network 304. Computing device 322 is serviced by network 308. Message processing server 310 couples to preferred language wireless network 302. Message processing server 314 couples to intermediate networks 306. Finally, foreign language network message server 316 couples to foreign language home wireless network 304.

According to the present invention, the preferred language wireless network 302 services text messages in a preferred language, i.e., English. In such case, the preferred language wireless network 302 may reside in the United States, for example. The foreign language home wireless network 304 may reside in a foreign company, e.g., the Czech Republic. In such case, the foreign language home wireless network 304 services mostly Czech language communications, including text messages. In such case, the foreign network message server 316 produces Czech text messages intended for wireless device 318 for transmission via the foreign language home wireless network 304. However, a user of wireless device 318 may be visiting the Czech Republic or be a resident of the Czech Republic and not be able to speak or read the Czech language. For example, the user of wireless device 318 may be a US foreign national that is currently residing in the Czech Republic. Thus, even though the foreign language home wireless network 304 is the home network for wireless device 318, the user of wireless device 318 receives messages in a foreign language that he cannot understand.

Thus, according to the embodiment of FIG. 3, the user of wireless device 318 may establish text message translation rules for implementation with respect to text messages intended for wireless device 318. In a first operation of this embodiment, foreign network message server 316 transmits a text message via foreign language home wireless network 304 that is intended for wireless device 318. However, with this embodiment, the user of wireless device 318 has previously arranged with foreign language home wireless network 304 for transfer of the text message to a message processing server 314 coupled to intermediate networks 306 for translation to the English language, i.e., the preferred language. After translation of the text message from the native language (Czech) to the preferred language (English) by the message processing server 314, the message processing server 314 transmits the text message in the preferred language (English) for delivery to wireless device 318 via intermediate network 306 and foreign language home wireless network 304.

According to another example of the operation of system 300 of FIG. 3, the foreign network message server 316 may perform translation of text messages for the wireless device 318 prior to initial transmission 316 or after receipt from a differing source. For example, computing device 322 coupled to network 308 may send a text message in the French language intended for wireless device 318 for transfer via networks 308, 306, and 304. However, based upon knowledge of the foreign network message server 316 that the wireless device 318 is currently being serviced by foreign language home wireless network 304, the foreign language home wireless network 304 directs the text message in the French language to the foreign network message server 316 for translation to the English language. Then, the translated text message in the English language is forwarded to the wireless device 318 via the foreign language home wireless network 304.

According to still another operation of an embodiment of FIG. 3, a text message is received by wireless device from foreign network message 316 that is in the Czech language. However, because the user of wireless device 318 cannot understand or read the Czech language, the user of wireless device 318 interacts with the wireless device 318 to forward the text message to message processing server 310 for translation to the English language. Subsequent to the translation of the text message from Czech language to the English language, message processing server 310 transmits the text message in the English language to the wireless device 318 via network 302, 306, and 304.

Figure 4:
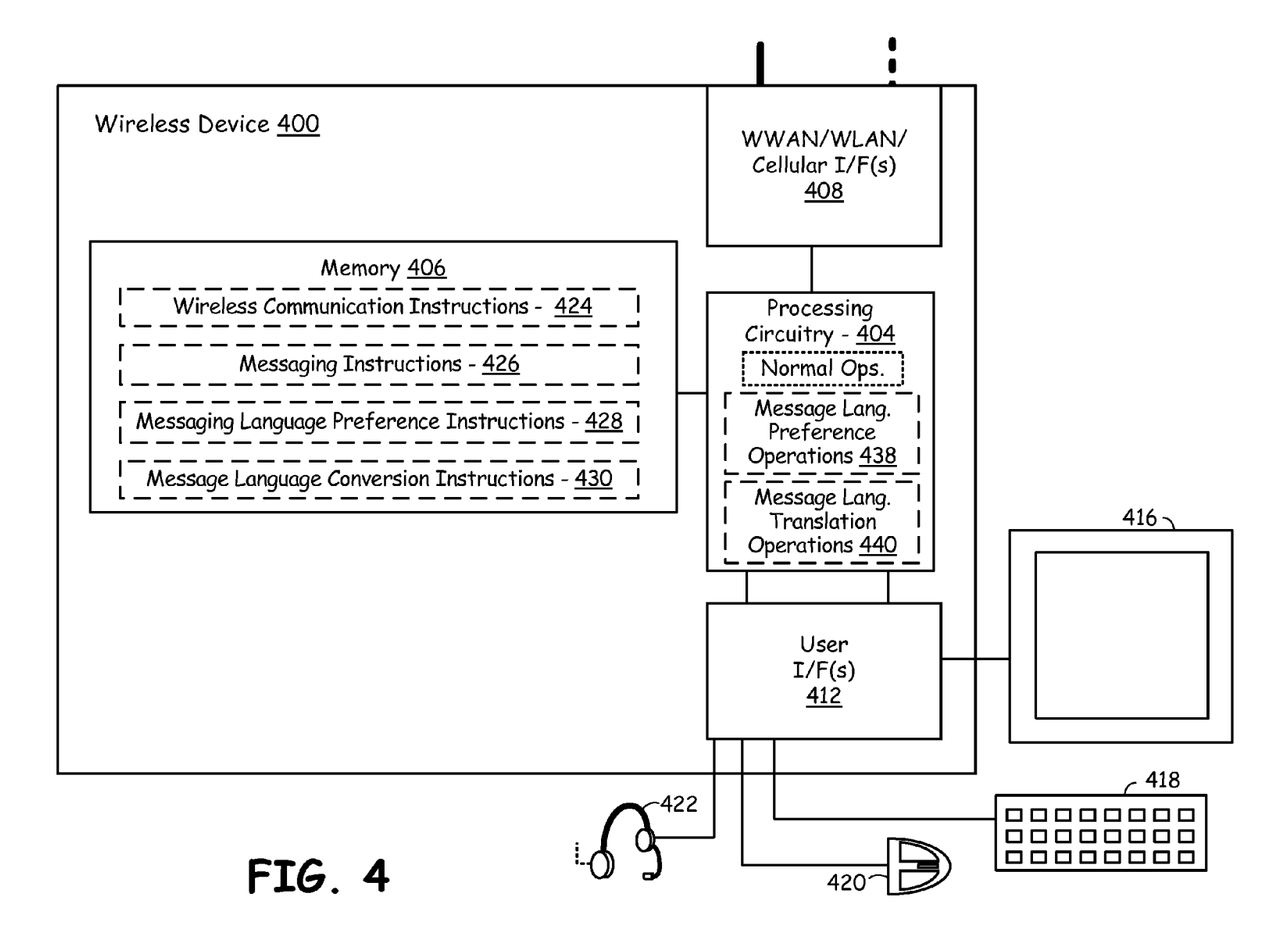
FIG. 4 is block diagram illustrating a wireless device constructed and operating according to one or more embodiments of the present invention.

FIG. 4 is block diagram illustrating a wireless device constructed and operating according to one or more embodiments of the present invention. The wireless device 400 shown represents any of the wireless devices 130-142 previously illustrated and described with reference to FIG. 1. Wireless device 400 includes processing circuitry 404, memory 406, a wireless interface 408, and user interfaces 412. The processing circuitry 404 may be a microprocessor, a digital signal processor, an Application Specific Integrated Circuit (ASIC), processing logic, or other circuitry that is capable of processing computer instructions and performing processing operations upon data. Memory 406 may include random access memory, read-only memory, optical storage, magnetic disk storage, flash memory, and/or any other type of memory that is capable of storing software instructions and data.

The wireless interface 408 includes one or more of cellular wireless network interfaces, WWAN interfaces, WLAN interfaces, and/or WPAN interfaces. The wireless interface 408 may support one or more of the North American TDMA standards, the North American CDMA standards, other American TDMA, FDMA, and/or CDMA standards, any one or more of the GSM standards, and/or other interface standards of the cellular type. The wireless interface 408 may support the WiMAX operating standard, any of the 802.11x operating standards and/or the Bluetooth operating standards, for example.

User interfaces 412 may interface with a wireless headset 422, a computer mouse 420, a keyboard 418, a monitor 416, and/or other user interface devices. The wireless device 400 may include an integrated keyboard 418, pointing device 420, audio interface 422 and/or display 416 in a single housing. Alternately, some of these user interface devices may be external to a housing of the wireless device 400. The reader should refer to FIGS. 1-3 in considering the various wireless devices that may incorporate the teachings of the present invention.

The processing circuitry 404 and memory 406 support operations of a wireless device 400 according to the present invention. Thus, processing circuitry 404 performs its normal operations and also performs message language preference operations 438 and message language conversion operations 440. The message language preference operations 438 generally include the wireless device 400 via user input providing its text message delivery language preferences. The message language translation operations 440 may include converting text messages from a native language to a preferred language. The processing circuitry 404 may include specialized circuitry to perform the message language preference operations 438 and/or the message language translation operations 440. Further, the processing circuitry 404 may perform these operations based upon execution of software instructions retrieved from memory.

In order to support the processing circuitry 404 operations, memory 406 stores a plurality of particular software instructions that are read from memory 406 by processing circuitry 404 and executed to perform corresponding operations. Generally, these instructions include wireless communication instructions 424 that enable the wireless device 400 to communicate via the wireless interface 408. Further, memory 406 stores messaging instructions 426 that are employed to support the receipt and transmission of text messages by the wireless device 400. Memory 406 also stores messaging language preference instructions 428 that upon execution of processing circuitry 404 cause the wireless device 400 to exchange or transmit text message delivery language preferences to a remote message processing server. Further, memory 406 stores message language translation instructions 430 that, upon execution by processing circuitry 404, enable the wireless device 400 to translate a text message from a native language to a preferred language.

Figure 5:
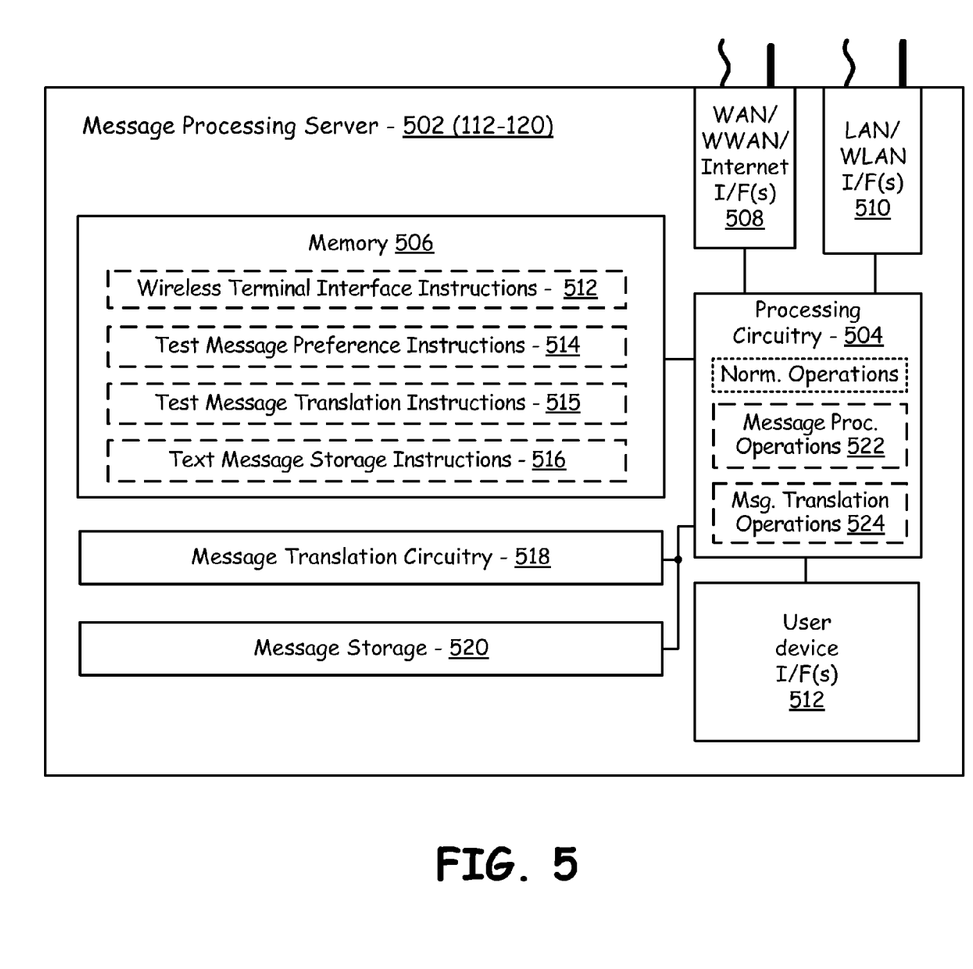
FIG. 5 is block diagram illustrating a message processing server constructed and operating according to one or more embodiments of the present invention.

FIG. 5 is block diagram illustrating a message processing server constructed and operating according to one or more embodiments of the present invention. The message processing server 502 of FIG. 5 may be one or more various embodiments of the message processing servers 112-118 previously illustrated and described with reference to FIG. 1. Further, the message server 502 may be one of the message servers 210, 212, or 214 of FIG. 2 or one or more of message processing servers 310, 314, and/or 316 of FIG. 3. The message processing server 502 includes processing circuitry 504, memory 506, a first communications interface 508, a second communications interface 510, and user device interfaces 512. The message processing server 502 may also include specialized circuitry such as message translation circuitry 518 and message storage circuitry 520. Message translation circuitry 518 is operable to translate a text message from a native language to a preferred language. Message storage 520 is operable to store text messages either in the native language or the preferred language.

The processing circuitry 504 may be a microprocessor, a digital signal processor, an Application Specific Integrated Circuit (ASIC), processing logic, or other circuitry that is capable of processing computer instructions and performing processing operations upon data. Memory 506 may include random access memory, read-only memory, optical storage, magnetic disk storage, flash memory, and/or any other type of memory that is capable of storing software instructions and data. The communications interfaces 508 and 510 support wired and/or wireless communications. The communications supported by the communications interface 508 and 510 may include WAN communications, LAN communications, Internet communications, WLAN communications, WPAN communications, and cellular communications.

According to the present invention, the processing circuitry 504, in addition to performing its normal operations, performs message processing operations 522 and message translation operations 524. The message processing operations 522 include receiving text message delivery language preferences regarding a wireless device. The message translation operations 524 include translating a text message from a native language to a preferred language according to the text message delivery language preferences.

In order to support the operations of the present invention, the memory 506 stores a plurality of instructions. The instructions include wireless terminal interface instructions 512, text message preference instructions 514, text message translation instructions 515, and text message storage instructions. Wireless terminal interface instructions 512 when executed by processing circuitry 504 enable the processing circuitry 504, in combination with one or both of the communication interfaces 508 and 512, to communicate with a wireless device via one or more networks and/or via one or more wireless links. The text message preference instructions 514, upon execution by processing circuitry 504, enable the message processing server 502 to interact with a wireless device or other device of the network to receive text message delivery language preferences regarding a wireless device. Of course, these text message delivery language preferences identify at least one preferred language per delivery of text messages to the wireless device. Text message translation instruction 515, upon execution by processing circuitry 504, enable the message processing server 502 to translate a text message from a native language to the preferred language according to the text message delivery language preferences. Text message storage instructions 516, upon execution by processing circuitry 504, enable the message processing server to store text messages either in message storage 520 or memory 506. The text messages may be stored prior to translation from the native language to the preferred language.

Figure 6:
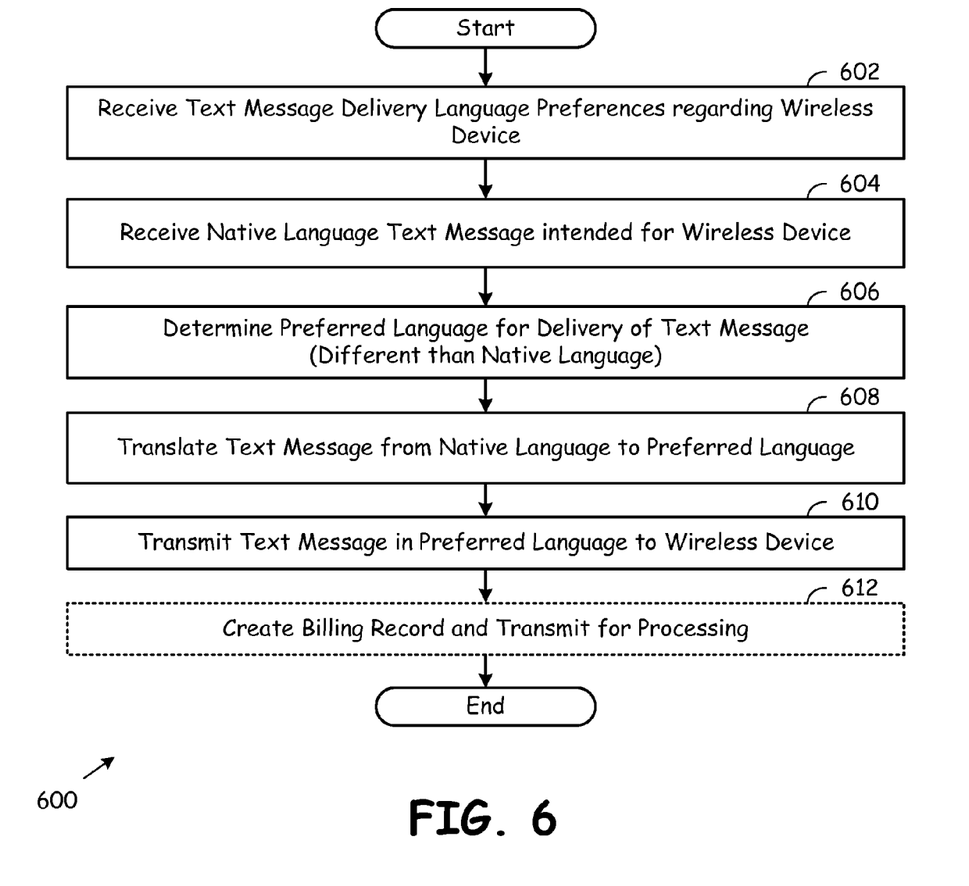
FIG. 6 is flow chart illustrating message processing operations of a message processing server according to one or more embodiments of the present invention.

FIG. 6 is flow chart illustrating message processing operations of a message processing server according to one or more embodiments of the present invention. The operations 600 of FIG. 6 commence with the message processing server receiving text message delivery language preferences regarding a wireless device (Step 602). The text message delivery language preferences identify at least one preferred language for delivery of text messages to a corresponding wireless device. Then, operations 600 proceed with the message processing server receiving a text message intended for the wireless device, the text message in a native language (Step 604). Note that the text message delivery language preferences received at Step 602 may be received: (1) prior to receipt of the text message; (2) concurrently with receipt of the text message; (3) after receipt of the text message; and/or (4) after receipt of the text message in response to a query sent by the message processing server.

Then, based upon the text message delivery language preferences regarding the wireless device, the message processing server determines a preferred language for delivery of the text message (Step 606). The preferred language is different from the native language. Then, the message processing server transmits the text message in the preferred language to the wireless device (Step 610). Finally, the message processing server may create a billing record and transmit the billing record for processing (Step 612). The billing record may be delivered to a central processing facility for organization and for subsequent creation of billing for the text message translation operations. According to one example embodiments of billings for the message translation, the source of the text message may be billed for such translation. According to another example of such operation, the wireless device receiving the text message may be billed for the translation. When the wireless device receiving the translated text message includes a SIM card from which debits may be made, the billing for the translation may be immediately debited from credit associated with the SIM card of the wireless device.

Figure 7:
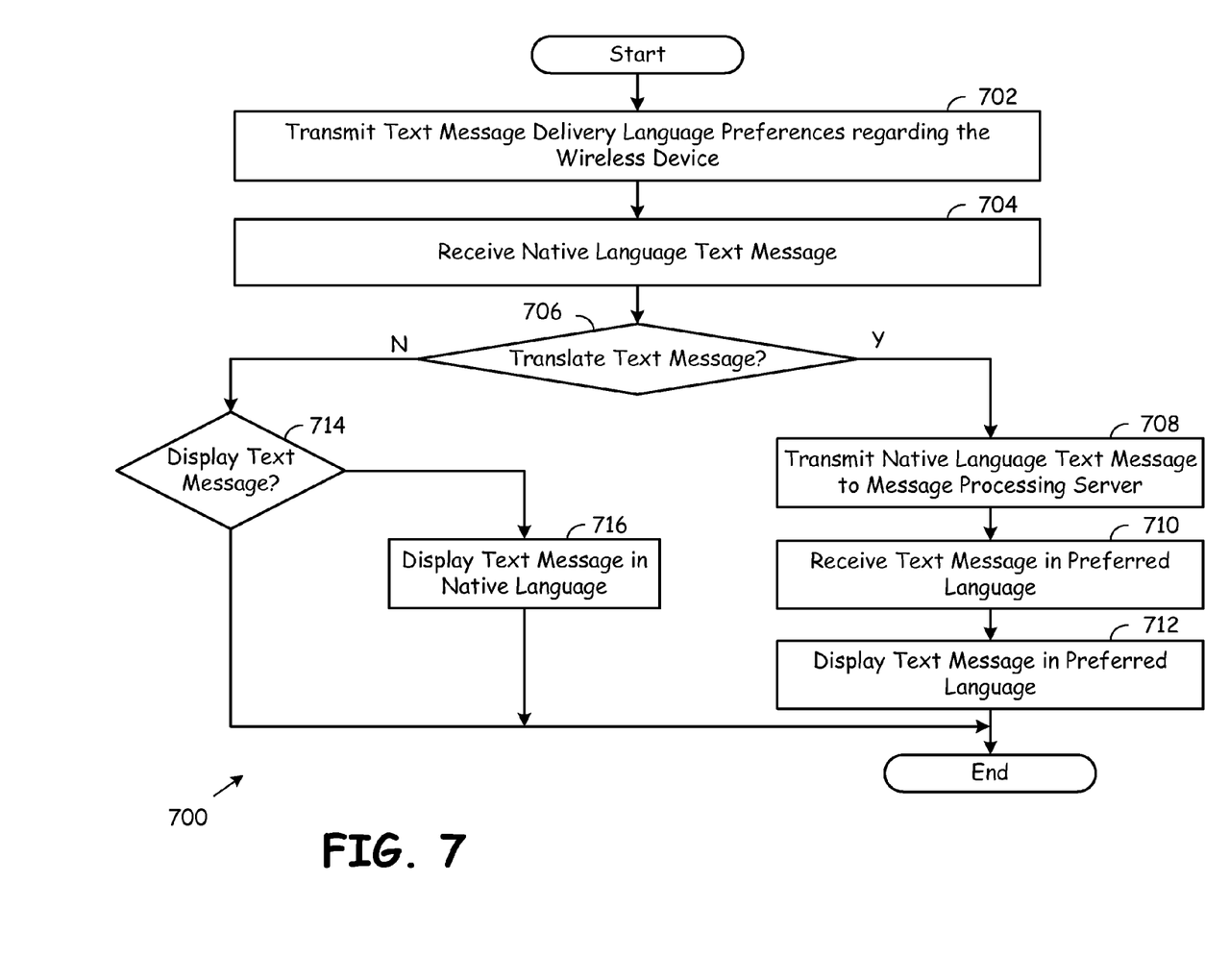
FIG. 7 is a flow chart illustrating message processing operations of a wireless device according to one or more embodiments of the present invention.

FIG. 7 is a flow chart illustrating message processing operations of a wireless device according to one or more embodiments of the present invention. The operations 700 of FIG. 7 commence with the wireless device transmitting text message delivery language preferences to a message processing server (Step 702). The text message delivery language preferences identify at least one preferred language for subsequent delivery of text messages to the wireless device. Operation continues with the wireless device receiving a text message in a native language (Step 704). Next, the wireless device determines whether or not it would like to have the text message translated (Step 706). This decision may be set to a default value of YES or NO by a user or may be determined based upon interaction with a user via a user interface.

If the wireless device chooses not to have the text message translated, perhaps with interaction with the user via user interface at Step 706, a decision is then made as to whether the text message will be displayed at all (Step 714). If the text message is not displayed at all as determined at Step 714, operation ends. If, based upon user input or some other settings, the wireless device decides to display the text message at Step 714, the wireless device displays the text message in the native language (Step 716).

Alternatively, at Step 706, the wireless device (based upon user interaction in some operations) determines that translation of the text message will be performed and it transmits the native language text message to a message processing server (Step 708). Note that the Steps 702 and 708 may be performed substantially concurrently. In such case, a single message could carry both the text message in the native language as well as the text message delivery language preferences. Then, in response to the request to translate the message, the wireless device receives the text message in the preferred language (Step 710). The wireless device then displays the text message in the preferred language (Step 712). From Step 712 operation ends.

The terms "circuit" and "circuitry" as used herein may refer to an independent circuit or to a portion of a multifunctional circuit that performs multiple underlying functions. For example, depending on the embodiment, processing circuitry may be implemented as a single chip processor or as a plurality of processing chips. Likewise, a first circuit and a second circuit may be combined in one embodiment into a single circuit or, in another embodiment, operate independently perhaps in separate chips. The term "chip", as used herein, refers to an integrated circuit. Circuits and circuitry may comprise general or specific purpose hardware, or may comprise such hardware and associated software such as firmware or object code.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output (s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

The invention claimed is:

1. A method for processing text messages comprising:
receiving text message delivery language preferences regarding a wireless device, the text message delivery language preferences identifying at least one preferred language for delivery of text messages to the wireless device;
receiving a text message from the wireless device subsequent to the wireless device receiving the text message from a separate source device, such that the source device initiates delivery of the text message to the wireless device, and the text message is in a native language;
based upon the text message delivery language preferences regarding the wireless device, determining a preferred language for delivery of the text message, the preferred language different than the native language;
translating the text message received from the wireless device from the native language to the preferred language; and
transmitting the text message in the preferred language to the wireless device.

2. The method of claim 1, further comprising:
creating a billing record regarding the translation; and
transmitting the billing record to a home network of the wireless device for billing to the wireless device.

3. The method of claim 1, further comprising:
creating a billing record regarding the translation; and
transmitting the billing record to a home network of the source device for billing to the source device.

4. The method of claim 1, wherein receiving text message delivery language preferences regarding the wireless device comprises receiving language preferences from the wireless device.

5. The method of claim 1, wherein receiving text message delivery language preferences regarding the wireless device comprises receiving language preferences from a corresponding home network of the wireless device.

6. The method of claim 1, wherein receiving the text message from the wireless device in the native language comprises receiving the text message from a wireless network that is the home service area of the wireless device.

7. The method of claim 1, wherein receiving the text message from the wireless device in the native language comprises receiving the text message from a wireless network in which the wireless device is currently visiting.

8. A message processing server comprising:
a communications interface; and
processing circuitry coupled to the communications interface, the processing circuitry in combination with the communications interface:
receives a text message intended for a wireless device from a foreign language message server servicing the wireless device, in accordance with a text message delivery language preference, wherein:
the text message is in a foreign language,
the foreign language is different from a preferred language,
the text message delivery language preference is received by the foreign language message server from the wireless device in response to the foreign language message server transmitting the text message to the wireless device, and
the text message delivery language preference instructs the foreign language message server to transmit the text message to the message processing server for translation to the preferred language; and
in response to receiving the text message, the message processing server:
translates the text message from the foreign language to the preferred language; and
transmits the text message to the foreign network message server in the preferred language for delivery to the wireless device.

9. The message processing server of claim 8, wherein the message processing server is communicatively coupled to the foreign language message processing server via at least one intermediate network.

10. The message processing server of claim 8, the processing circuitry further configured to:
create a billing record regarding the translation; and
transmit the billing record to a home network of the wireless device for billing to the wireless device.

11. The message processing server of claim 10, the processing circuitry further configured to:
create a billing record regarding the translation; and
transmit the billing record to a home network of the wireless device for billing to the wireless device.

12. The message processing server of claim 10, the processing circuitry further configured to:
create a billing record regarding the translation; and
transmit the billing record to a home network of a source device for billing to the source device.

13. The message processing server of claim 10, wherein receiving text message delivery language preferences comprises receiving language preferences from the wireless device to which the text message is to be delivered.

14. The message processing server of claim 10, wherein receiving text message delivery language preferences regarding the plurality of wireless devices comprises receiving language preferences from a corresponding home network of the wireless device to which the text message is to be delivered.

15. The message processing server of claim 10, wherein receiving the text message intended for the wireless device in the foreign language comprises receiving the text message from a wireless network in which the wireless device is currently visiting.

16. The message processing server of claim 8, the processing circuitry further configured to:
create a billing record regarding the translation; and transmit the billing record to a home network of a source device for billing to the source device.

17. The message processing server of claim 8, wherein receiving the text message intended for the wireless device in the foreign language comprises receiving the text message from a wireless network that is the home service area of the wireless device.

18. A message processing server comprising:

a communications interface; and processing circuitry coupled to the communications interface, the processing circuitry in combination with the communications interface configured to:

receive a text message from a wireless device subsequent to the wireless device receiving the text message from a separate source device, the text message in a native language, such that the source device initiates delivery of the text message to the wireless device and the text message is to be delivered back to the wireless device from the message processing server upon translation to a language different from the native language;

receive, from the wireless device and concurrently with receiving the text message, text message delivery language preferences regarding the wireless device, the text message delivery language preferences identifying at least one preferred language for delivery of text messages to the wireless device;

based upon the text message delivery language preferences regarding the wireless device, determine a preferred language for delivery of the text message, the preferred language different than the native language;

translate the text message from the native language to the preferred language based on the text message delivery language preferences received concurrently with the text message; and transmit the text message in the preferred language to the wireless device.

* * * * *